United States Patent Office 2,865,755
Patented Dec. 23, 1958

2,865,755

REDUCING THE TENDENCY OF BEER TOWARDS GUSHING AND INCREASING ITS FOAM STABILITY

Richard Stanley Wrey Thorne, Holte, Denmark, assignor to Alfred Jorgensen's gaeringsfysiologiske Laboratorium, Copenhagen, Denmark, a firm No Drawing. Application March 25, 1957
Serial No. 647,967

Claims priority, application Denmark May 16, 1956

8 Claims. (Cl. 99—48)

The occurrence of that defect in bottled beer known as gushing or overfoaming has something of the character of an epidemic, being limited usually to particular geographical regions. Gushing is manifested by an abnormally rapid evolution of carbon dioxide as soon as the bottle is opened, the foam so formed overflowing from the bottle and carrying with it a more or less considerable volume of beer. The periodic and more or less localised occurrence of overfoaming seems to be caused by defects, whose nature is not understood, in the barley used for brewing: these defects only appear in certain seasons and within certain localities, and are presumably dependent upon the particular weather conditions prevailing during the growth and harvesting of the barley.

It is well known that gushing is developed in beer which already has the tendency to it if the bottles are, at any time between pasteurisation and opening, exposed to shaking or vibration, as for example, during shipment. This circumstance is utilized in investigating the problem of over-foaming: bottles of the beer to be examined are shaken for, for example, 48 hours and then allowed to rest for, for example, 2 hours at 20° C. before being opened. The amount of overfoaming can then be measured by filling the bottles up to the original beer level with water from a burette.

While gushing is a highly undesirable quality, it is very desirable on the other hand, that the layer of foam formed on the surface of the beer when poured from the bottle to the glass should be as stable as possible. An estimate of this foam stability is obtained, for instance, according to Blom, by producing foam from a sample of the beer in a particular apparatus under standardized conditions by introducing carbon dioxide into the beer through a porous body, and then measuring the rate of collapse of the foam. From determinations made in this way the "half-life period" of the foam in seconds may be calculated and used as a measure of foam duration.

It has now been found that the tendency to gushing in beer can be reduced or wholly eliminated and at the same time the stability of the foam can be increased by incorporating with the beer a small proportion of cobalt.

An object of my present invention, therefore, is beer containing a proportion of cobalt adequate for these purposes but not toxic, such proportions being within the range of 0.1 to about 5 mg. per litre. On the other hand cobalt generally exhibits its full effects in the above-mentioned respects below the said upper limit, and a further more specific object of my invention is therefore beer containing cobalt in a proportion within the range of 0.1–1 mg. per litre above which a useful increase in the effect cannot generally be obtained.

Generally, the overcoming of the tendency to gushing is of importance only in connection with bottled beer, which expression, for the purposes of the present invention is to be understood to comprise also canned beer and beer placed in other sealed containers intended to be opened immediately before the consumption of the beer, and in which containers the beer is transported and sold to consumers.

Accordingly a still further object of my invention is (in connection with the manufacture of bottled beer, which manufacture includes the bottling or corresponding operation by which the beer is placed into the containers in which transportation and sale is to take place, and the sealing of such containers) the incorporation with any material used at any stage in the manufacture of the finished beer after the main fermentation, of a non-toxic amount of cobalt exceeding 0.1 mg. per litre of the beer.

A still further object of my invention is the provision of convenient means by which the cobalt can be so added during the manufacture of bottled beer.

One mode of carrying my invention into effect is therefore, to add to beer subsequent to pasteurization an adequate proportion of an inorganic cobaltous salt. This embodiment of the invention has been used in the following Experiments 1–3, typical of a great number of experiments carried out to illustrate the effect obtained by the incorporation of cobalt with the beer. Experiment 4 similarly illustrates the effect of adding the cobalt under other conditions.

Experiment 1

Various types of beer from seven different breweries, referred to as A–G, were examined for gushing and foam stability with and without addition of cobalt. The cobalt was added to the beer subsequent to the pasteurization thereof, in the form of cobaltous nitrate $Co(NO_3)_2$ or cobaltous chloride $CoCl_2$ in an amount corresponding to 1 milligram cobalt to each litre of beer. The following table shows the reduction of gushing achieved by the addition of cobalt expressed as percentage of the gushing found in the corresponding untreated beer; a dash means that there was no gushing in the untreated beer. The increase in foam stability is given as the difference between the half-life period of the foam, in seconds, in the untreated and treated beer respectively.

| brewery | type of beer | decrease in gushing | foam stability of untreated beer—acc. to Blom | increase in foam stability |
|---|---|---|---|---|
| A | light Pilsener | — | 80 | 9 |
| A | Pilsener | 95 | 85 | 8 |
| B | do | — | 94 | 8 |
| C | light Pilsener | 97 | — | — |
| C | Pilsener | 72 | 79 | 9 |
| D | do | 100 | 92 | 7 |
| E | light Pilsener | — | 82 | 5 |
| E | Pilsener | — | 78 | 8 |
| E | export Pilsener | 90 | 79 | 9 |
| F | Pilsener | 88 | 76 | 4 |
| G | do | 79 | 85 | 3 |
| | | [1] 89 | | [1] 7 |

[1] Average.

It will be seen that the addition of the above-mentioned amount of cobalt to beer is very effective against gushing, since on the average it has reduced the gushing to 11% of the gushing of the untreated beer. Moreover a very desirable increase in foam duration, averaging 7 units, has been achieved.

Experiment 2

In order to give an idea of the variability in gushing between individual bottles in estimations of the kind represented by Experiment 1 an individual example will now be described. Gushing is here expressed as cm.³ per bottle containing 330 cm.³ of beer.

| | | | | | | | | |
|---|---|---|---|---|---|---|---|---|
| Without addition of Co | 27 | 21 | 24 | 15 | 15 | 29 | 18 | [1] 21.0 |
| With addition of Co (1 mg. per litre) | 0 | 0 | 3 | 0 | 0 | 2 | 0 | [1] 0.7 |

[1] Mean.

In the bottles treated with cobalt gushing in no case reaches an objectionable level.

Experiment 3

The experiments represented by Examples 1 and 2 show clearly that the incorporation with the beer of 1 mg. cobalt per litre causes a very satisfactory decrease in the tendency to gushing. The following experiment, however, shows the effect of lower concentrations of cobalt, in a particular kind of beer.

The results are expressed as the decrease in gushing produced by each of the concentrations of cobalt stated, in per cent of the gushing in the untreated beer.

| mg. Co per litre | 0.00 | 0.05 | 0.10 | 0.15 | 0.20 | 0.25 | 0.50 | 1.00 |
|---|---|---|---|---|---|---|---|---|
| percent decrease in gushing | 0 | 12 | 20 | 40 | 64 | 78 | 100 | 100 |

The experiment shows that the effect of proportions of cobalt so small as 1/20 mg. Co per litre is demonstrable, and that a significant effect is obtained by the addition of not more than 1/10 mg. per litre.

Satisfactory results will in most cases be obtained by adding 0.1–1 mg. Co per litre, whereas, on the other hand the addition of amounts exceeding 1.0 mg. per litre will rarely produce an appreciable improvement of the results already obtained by addition of the said amount.

Experiment 4

The results described above were obtained in laboratory experiments in which cobalt was added to the beer after pasteurization. For the sake of completeness experimental results extracted from a long series of practical brewery trials in which 1 mg. cobalt per litre was added to beer immediately prior to filtration, bottling and pasteurization are reported in the following. The beer treated in this manner was then subjected to normal conditions of transport after having been left standing for varying periods of time up to 8 weeks after bottling. 377 bottles of non-treated beer were examined and gushing was found in 241 of these bottles, that is, 64 percent of the total number of bottles of untreated beer examined. On opening 380 bottles of the same beer treated with 1 mg. cobalt per litre, however, gushing did not occur in any of them.

Instead of adding cobalt in the form of inorganic salts it can be added with the same effect in the form of organic cobalt compounds, particularly in the form of cobaltous salts of organic acids, for instance cobaltous acetate or citrate. Complex cobaltic compounds, for instance hexamine cobaltic chloride or aquapentamine cobaltic chloride appear, however, to have little or no effect with respect to decreasing gushing or increasing foam stability, when used in concentrations equivalent to those stated above. Thus it appears that the effect of cobalt in reducing the tendency to gushing and in increasing foam stability must be due to the cobaltous ion $Co^{++}$. The invention is, however, not bound to this theory the correctness of which cannot be considered finally established.

Since cobalt salts are readily soluble they may be added in connection with other additions at any stage of the production of the beer after the main fermentation, for instance, immediately prior to bottling. On the other hand, it would not be appropriate to add the cobalt before or during the main fermentation, since it is known that cobalt is readily assimilated by yeast and consequently a great part of it would be removed from the beer with the yeast. Cobalt may however be incorporated in, for instance, enzyme preparations, used for improving the stability of the beer against the formation of turbidity by chilling or oxydation, or in clarifiers used in treatment of the beer, for instance tannic acid or bentonite. It may also be added to and incorporated with the beer with such additions as are sometimes made to the beer for the purpose of improving the stability of the foam or with materials or preparations used as taste correctives, such as sugar, or color correctives, such as caramel.

It has been found that, contrary to other metals (Fe, Cu, Ni) cobalt has no detectable unfavorable influence on the taste and the keeping qualities of beer; this must be considered as a valuable property of this substance.

The effect of cobalt on the gushing of beer is surprising, for it is known that the presence of a metal closely related to cobalt, viz. iron, in concentrations of 1–3 mg. per litre will induce gushing. For this reason it has been proposed to combat gushing by adding chelating agents such as versene (the sodium salt of ethylene diamine tetraacetic acid) capable of binding such amounts of iron in complex form. These agents have been found active against gushing in some cases, whereas other cases are known in which they were without effect.

The mechanism of the effect of cobalt on gushing and foam stability is not known, though it presumably involves the ability of cobalt atoms to form complex compounds with other substances, for instance, those of protein character, so that aggregates of increased molecular weight are formed. If this presumption is correct it may be expected that beers may occasionally be encountered upon which cobalt will not exercise the effect described above owing to their being deficient in the necessary substances with which, according to this hypothesis, cobalt is able to form complex compounds, or to their presence in insufficient amounts.

What I claim is:

1. Beer containing non-toxic cobaltous salts in an amount corresponding to 0.1 to 5.0 mg. of cobalt per litre.

2. Beer containing non-toxic cobaltous salts in an amount corresponding to 0.1 to 1.0 mg. of cobalt per litre.

3. Beer containing a cobaltous salt selected from the group consisting of cobaltous nitrate, cobaltous chloride, cobaltous acetate and cobaltous citrate, in an amount corresponding to 0.1 to 5.0 mg. of cobalt per litre.

4. Beer containing a cobaltous salt selected from the group consisting of cobaltous nitrate, cobaltous chloride, cobaltous acetate and cobaltous citrate, in an amount corresponding to 0.1 to 1.0 mg. of cobalt per litre.

5. In the manufacture of beer for sale in sealed containers, a method of avoiding gushing of the beer upon the opening of the containers comprising adding to the beer, at any stage in the manufacture thereof following the main fermentation of the beer, non-toxic cobaltous salts in an amount corresponding to 0.1 to 5.0 mg. of cobalt per litre of beer.

6. In the manufacture of beer for sale in sealed containers, a method of avoiding gushing of the beer upon opening of the containers comprising adding to the beer at any stage in the manufacture thereof following the main fermentation of the beer (non-toxic cobaltous salts in an amount corresponding to 0.1 to 1.0 mg. of cobalt per litre of beer.

7. In the manufacture of beer for sale in sealed containers, a method of avoiding gushing of the beer upon opening of the containers comprising adding to the beer, at any stage in the manufacture thereof following the main fermentation of the beer, a cobaltous salt selected from the group consisting of cobaltous nitrate, cobaltous chloride, cobaltous acetate and cobaltous citrate, in an amount corresponding to 0.1 to 5.0 mg. of cobalt per litre of beer.

8. In the manufacture of beer for sale in sealed containers, a method of avoiding gushing of the beer upon opening of the containers comprising adding to the beer, at any stage in the manufacture thereof following the main fermentation of the beer, a cobaltous salt selected from the group consisting of cobaltous nitrate, cobaltous chloride, cobaltous acetate and cobaltous citrate, in an amount corresponding to 0.1 to 1.0 mg. of cobalt per litre of beer.

References Cited in the file of this patent

UNITED STATES PATENTS 2,711,963    Gray ------------------ June 28, 1955

OTHER REFERENCES

Industrial and Eng. Chem., News Edition, vol. 12, No. 7, April 10, 1934, pp. 120 and 121.